(12) United States Patent
Cox et al.

(10) Patent No.: US 7,689,245 B2
(45) Date of Patent: Mar. 30, 2010

(54) SYSTEM AND METHOD OF UBIQUITOUS LANGUAGE TRANSLATION FOR WIRELESS DEVICES

(75) Inventors: Richard Vandervoort Cox, New Providence, NJ (US); Thomas M. Isaacson, Huntingtown, MD (US)

(73) Assignee: AT&T Intellectual Property II, L.P., New York, NY (US)

( * ) Notice: Subject to any disclaimer, the term of this patent is extended or adjusted under 35 U.S.C. 154(b) by 320 days.

(21) Appl. No.: 11/838,288

(22) Filed: Aug. 14, 2007

(65) Prior Publication Data

US 2008/0021697 A1    Jan. 24, 2008

Related U.S. Application Data

(63) Continuation of application No. 10/067,851, filed on Feb. 7, 2002, now Pat. No. 7,272,377.

(51) Int. Cl.
*H04M 1/00*     (2006.01)
(52) U.S. Cl. ................. 455/550.1; 455/414.1; 455/563; 455/566
(58) Field of Classification Search ............... 455/550.1, 455/566, 414.1, 414.4, 466, 403, 558, 556.2, 455/563; 704/2, 8, 277
See application file for complete search history.

(56) References Cited

U.S. PATENT DOCUMENTS

| | | | |
|---|---|---|---|
| 4,882,681 | A | 11/1989 | Brotz |
| 5,497,319 | A | 3/1996 | Chong et al. |
| 5,528,491 | A | 6/1996 | Kuno et al. |
| 5,615,301 | A | 3/1997 | Rivers |
| 5,765,131 | A | 6/1998 | Stentiford et al. |
| 5,768,603 | A | 6/1998 | Brown et al. |

(Continued)

FOREIGN PATENT DOCUMENTS

EP    0 311 416    4/1989

(Continued)

OTHER PUBLICATIONS

Jie Yang et al., "Smart Sight: A Tourist Assistant System", Wearable Computers, 1999, Digest of Papers, The Third International Symposium of San Francisco, CA, USA Oct. 18-19, 1999, Los Alamitos, CA, USA, IEEE Comput. Soc., U.S pp. 73-78.

*Primary Examiner*—CongVan Tran

(57) ABSTRACT

A system and method of providing a location-based translation service is disclosed. A wireless device receives from a wireless network an updated priority target language list according to the location of the wireless device. The wireless device and/or wireless network are capable of automatic speech recognition (ASR), text-to-speech (TTS) services and language translation services. A language and location database module associates probable target languages in a given area. The wireless network node receives the location of the wireless device through a network-based location means or through a GPS system and compares the location of the wireless device to the language and location database. The wireless network transmits to the wireless device an updated priority language list based on the data in the language and location database such that the wireless device pre-selects the most likely target language if the user launches the language translation application. When the user launches the language translation application, the selection of the target language is simplified since the most likely target language is pre-selected.

6 Claims, 4 Drawing Sheets

U.S. PATENT DOCUMENTS

| | | |
|---|---|---|
| 5,794,218 A | 8/1998 | Jennings et al. |
| 5,797,011 A | 8/1998 | Kroll et al. |
| 5,805,832 A | 9/1998 | Brown et al. |
| 5,812,865 A | 9/1998 | Theimer et al. |
| 5,875,422 A | 2/1999 | Eslambolchi et al. |
| 5,884,247 A | 3/1999 | Christy |
| 5,946,376 A | 8/1999 | Cistulli |
| 5,987,401 A | 11/1999 | Trudeau |
| 6,161,082 A | 12/2000 | Goldberg et al. |
| 6,175,789 B1 | 1/2001 | Beckert et al. |
| 6,233,544 B1 | 5/2001 | Alshawi |
| 6,243,669 B1 | 6/2001 | Horiguchi et al. |
| 6,243,681 B1 | 6/2001 | Guji et al. |
| 6,266,642 B1 | 7/2001 | Franz et al. |
| 6,275,789 B1 | 8/2001 | Moser et al. |
| 6,385,586 B1 | 5/2002 | Dietz |
| 6,473,621 B1 | 10/2002 | Heie |
| 6,600,919 B1 | 7/2003 | Kawase |
| 6,611,831 B1 | 8/2003 | Dunn et al. |
| 6,907,256 B2 | 6/2005 | Hokao |
| 6,944,464 B2 | 9/2005 | Muranaga |
| 6,947,731 B1 | 9/2005 | Kamperschroer |
| 7,221,933 B2 * | 5/2007 | Sauer et al. ............... 455/412.1 |
| 2001/0029455 A1 * | 10/2001 | Chin et al. ................... 704/277 |
| 2001/0034599 A1 | 10/2001 | Kage et al. |
| 2002/0022498 A1 * | 2/2002 | Hokao ........................ 455/556 |
| 2002/0046035 A1 * | 4/2002 | Kitahara et al. ............. 704/277 |
| 2002/0160766 A1 | 10/2002 | Portman et al. |
| 2003/0040340 A1 | 2/2003 | Smethers |
| 2003/0065504 A1 | 4/2003 | Kraemer et al. |

FOREIGN PATENT DOCUMENTS

| | | |
|---|---|---|
| JP | 06-072762 | 3/1994 |
| JP | 2000-194698 | 7/2000 |
| JP | 2001-036966 | 2/2001 |
| JP | 2001-148756 | 5/2001 |
| JP | 2001-292234 | 10/2001 |
| JP | 2002-055978 | 2/2002 |
| JP | 2002-247646 | 8/2002 |
| JP | 2002-315036 | 10/2002 |
| WO | WO 01/27829 | 4/2001 |

* cited by examiner

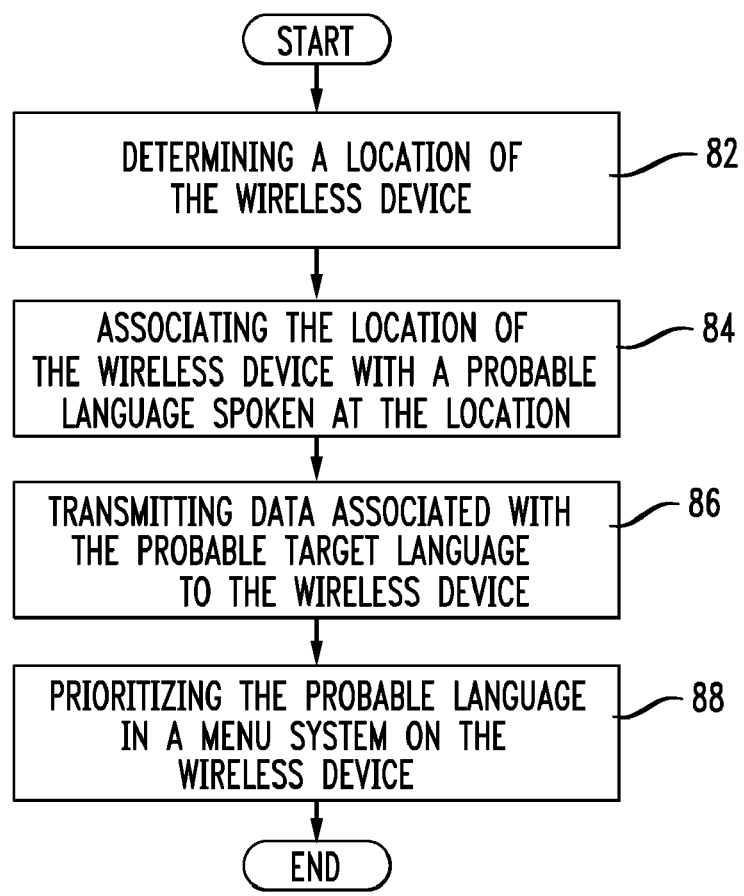
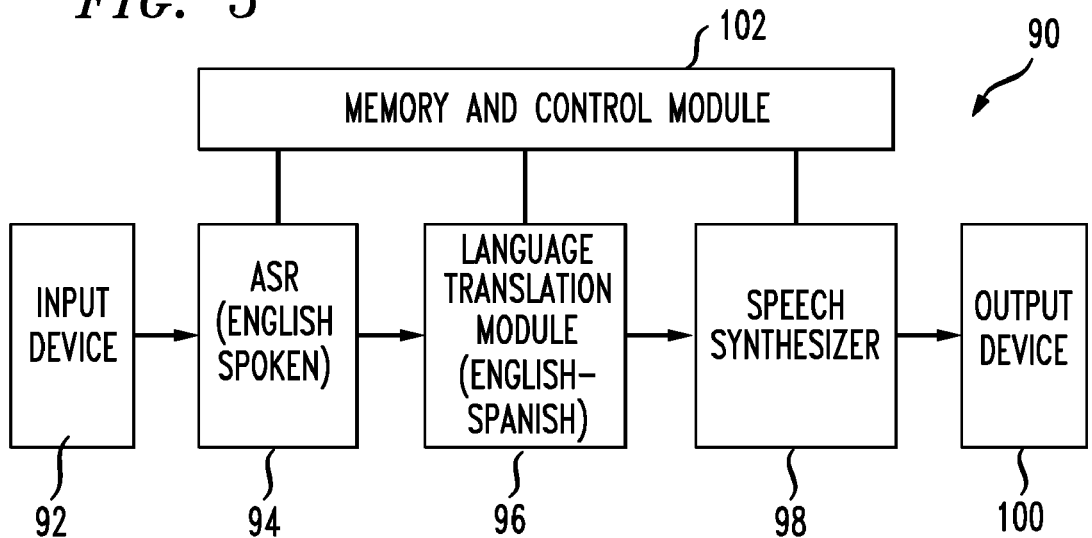

SYSTEM AND METHOD OF UBIQUITOUS LANGUAGE TRANSLATION FOR WIRELESS DEVICES

The present application is a continuation of U.S. patent application Ser. No. 10/067,851, filed Feb. 7, 2002, the contents of which are incorporated herein by reference in their entirety. The present application is related to U.S. patent application Ser. No. 11/235,818, filed Sep. 27, 2005, the contents of which are incorporated herein by reference in their entirety.

BACKGROUND OF THE INVENTION

1. Field of the Invention

The present invention relates to a system and method of providing language translation services and more particularly to a system and method of providing location-based language translation services for a wireless device.

2. Discussion of Related Art

Language translation services are becoming more common as automatic speech recognition (ASR) systems and language translation systems improve. For example, FIG. 5 illustrates a known translation system 50 including an input device 52 such as a microphone and computer device or wireless device. An ASR module 54 receives the speech signal from the input device 52. The ASR module 54 uses any one of many known techniques for speech recognition to determine the content of the speech signal.

As used herein, a "source" language is the language of the received speech signal, such as English or Japanese. Not shown in FIG. 5 are other elements that may include a digitizer and data transfer bus between the input device 92 and ASR module 94. The system 90 further includes a language translation module 96 and a speech synthesizer module 98 that transmits the synthesized speech to an output device 100. These modules may also be any known modules for language translation and speech synthesis. A control and memory module 102 stores data and controls the operation of the associated components. The language translation module 96 has an associated "target" language into which the source language is translated. In FIG. 5, the "target language" is Spanish. A sample of a portable speech translation system may be found in U.S. Pat. No. 6,266,642, the contents of which are incorporated herein by reference.

To translate an English message into Spanish, the ASR module 94 recognizes the message in English, the translation module 96 translates the English into Spanish, the speech synthesizer 98 synthesizes the message in Spanish and the output device 100 speaks the synthesized Spanish version of the message. The translation module 96 may comprise a text-to-text translation model such as that disclosed in U.S. Pat. No. 5,805,832 to Brown et al., incorporated herein. Any other suitable translation means may be employed and such means as are presently known or subsequently developed may be used for the language translation.

Translation devices may be wireless as taught in U.S. Pat. No. 6,266,642 to Franz et al. ("Franz et al."), also incorporated herein by reference. Franz et al. disclose a method and an apparatus for performing spoken language translation. A source language speech input is received. The speech input comprises words, sentences, and phrases in a natural spoken language. The apparatus recognizes source expressions in the source language. Through an interactive dialogue, the user selects and confirms a recognized source expression. The apparatus translates the recognized source expressions from the source language to a target language, and synthesizes a speech output from the translated target language source expressions. Moreover, the apparatus detects a meaning of the speech input, and renders the meaning in the synthesized translated output.

Franz et al. further disclose a portable unit, such as a cellular phone, that performs spoken language translation. The cellular phone receives a natural spoken language input, performs translation, performs speech synthesis on the translation, and outputs translated natural spoken language.

U.S. Pat. No. 4,882,681 to Brotz ("Brotz"), incorporated herein by reference, also discloses a wireless translation system similar to the Franz et al. system. Brotz discloses a system for simultaneously translating a conversation through a wireless device where a remote computer server performs language translation and synthesis. While the Brotz and Franz et al. systems provide basic translation services on a portable device, their systems are inefficient for a user who travels from one location to another where a variety of different target languages are spoken. Franz et al. only focus on a source language being translated into a single target language. In fact, Franz et al. are silent with regards to choosing which target language into which the source language is translated. Brotz's system requires a user of a mobile device to select a different frequency to change the target language. For example, if a user needs translation services from English to French, the system uses one frequency, and if the user requires Spanish translation, he or she selects a different frequency in order to indicate to the computer system to switch language translation compilers.

These related systems render the process of selecting and switching between target languages cumbersome. Either they disclose no efficient method of changing target languages or they require changing between frequencies or requiring a user to maneuver through a menu system to request a target language preference inhibit and complicate the use of mobile language translation system.

SUMMARY OF THE INVENTION

The complicated methods for selecting a target language when using mobile language translation system invoke the need for the present invention. Individuals often travel from region to region and encounter instances where they require translation services in varying target languages based on their location. For example, when traveling through Europe, an English speaking person may encounter people who only speak French, German, or Spanish. By traveling from region to region, the English speaking person may need the often change the "target" translation language he or she needs.

In addition to the related art not disclosing how to provide the source language speaker with an effective means of selecting a target language, the related art fails to disclose a system and method of translating a source language to a target language that is location based. For a user that travels throughout the world, a complicated menu system or frequency selection system must be navigated to arrive at the target language.

In order to address these deficiencies in the related art, the present invention comprises a location-based translation service that automatically provides the target language based on the location of the wireless device. In one aspect of the invention, the wireless device and wireless network are capable of automatic speech recognition (ASR), text-to-speech (TTS) services and language translation services. For example, concepts according to the network-based language translation disclosed in U.S. Pat. No. 6,161,082, assigned to the assignee of the present invention and incorporated herein by reference, may be applied to provide the network ASR and TTS requirements for the network. The present invention relates to using these known services in a more convenient manner for language translation.

The first embodiment of the invention is a system for providing location-based translation services through a wireless device. The system communicates with a wireless device having software for transmitting and receiving the language translation data. The system comprises an automatic speech recognition module, a translator module, a speech synthesizer module, a processor with memory, a language module, and a language and location database module. These modules are associated with a wireless network node. The language and location database module associate probable languages spoken according to any given area. The wireless network node receives the location of the wireless device through a wireless network-based location means or through a GPS system and compares the location of the wireless device to the language and location database.

The system transmits to the wireless device an updated priority language list based on the data in the language and location database such that the most likely translation language needed is pre-selected when the user launches the translation application. As an example, if a user brings the wireless device into a predominantly Chinese speaking area in a city such as Washington D.C., the network will update the wireless device with a reordering of the language translation priority. Then when the user launches the language translation application, the wireless device pre-selects Chinese as the target language and immediately the user can begin a message in the source language for translation. This invention reduces the clicks or inputs required by the user to get into a translation application for the target language.

In addition to the most probable language needed being transmitted, an aspect of the invention includes the wireless computer network transmitting to the wireless device a prioritized list of target languages according to the probability of need. In this way, if the user does not desire the most probable language for translation, the user may easily access other likely languages for selection.

The method according to another embodiment of the invention comprises determining a location of the wireless device, associating the location of the wireless device with the most probable language spoken at the location and pre-selecting the most probable language spoken at the location. Therefore, when a user requests language translation services, the wireless device translates speech into the most probable language without further user language selection action. The method may comprise transmitting a group or prioritized list of probable languages needed to the wireless device. If such a list exists, the method may further comprise presenting the user with a menu of the group of prioritized probable languages spoken at the location. The user may access this list through some selection action or the list may be presented on a screen when translation services are requested.

BRIEF DESCRIPTION OF THE DRAWINGS

The foregoing advantages of the present invention will be apparent from the following detailed description of several embodiments of the invention with reference to the corresponding accompanying drawings, in which:

FIG. 4 illustrates a method of providing language translation on a wireless device according to an embodiment of the invention; and FIG. 5 illustrates a prior art system for language translation.

DETAILED DESCRIPTION OF THE INVENTION

The present invention may be understood with reference to the drawings and the description herein. The aspects of the invention related to the ASR and TTS systems are not critical to practicing the invention but provide for a more efficient use of translation services. Accordingly, the fundamental feature of the invention is the location-based translation service and not how the system receives the text of the message in the source language or how the system presents the translated text in the target language.

Figure 1:
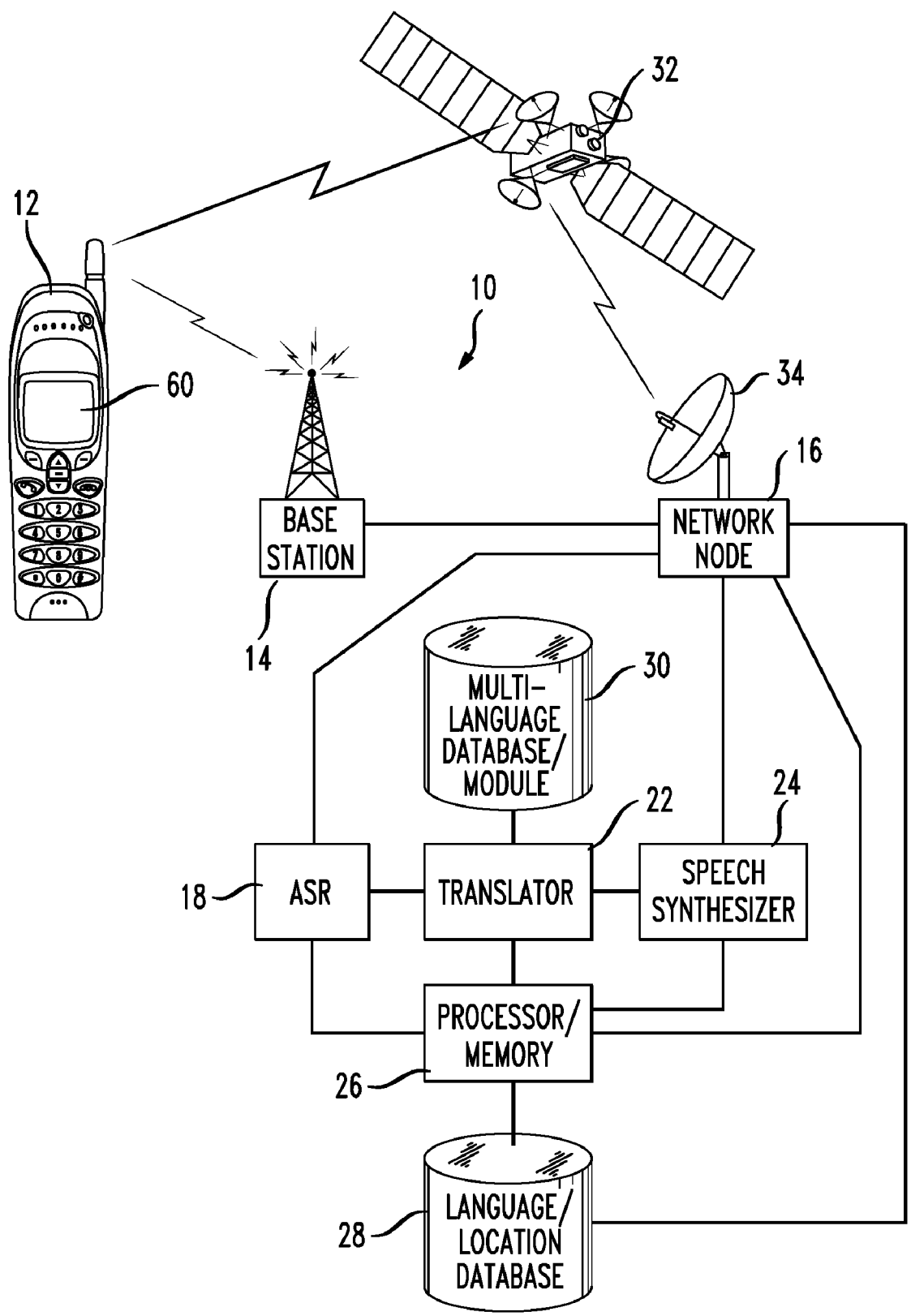
FIG. 1 illustrates the basic configuration of an aspect of the invention.

The first embodiment of the invention, as shown in FIG. 1, relates to a system 10 for providing ubiquitous language translation services using a wireless device 12 having a display 60. An exemplary system includes a source language input device such as a wireless device 12 that communicates with a base station 14. The wireless device 12 may be any type of wireless device communicating with the network using any wireless protocol. Since the wireless device 12 is the input device for the source speech (as well as the output device for the synthesized speech), it includes the capability of receiving the source message through means such as a microphone and ASR system or through the user typing the text. Further, the wireless device is preferable a multi-modal input/output device that may receive action button "clicks" via a stylus on a touch sensitive screen or through any other input means.

In the aspect of the invention where an ASR method provides the device with the source message text, automatic speech recognition is performed either locally on the device 12 or via the network. FIG. 1 illustrates a network-based ASR module 18 associated with the network node 16. Any known means of ASR may be employed and as discussed above, Franz et al. disclose both a local and a network based translation system for the wireless device 12. It is immaterial to the present invention whether these are performed locally on the wireless device 12 or on the network. In the preferred embodiment of the invention, the network performs the ASR and speech synthesis functions. If the ASR, language translation and speech synthesis functions are performed locally on the wireless device 12, then the only information transmitted to the wireless device by the network is the updated language priority listing to prioritize the target language list. Further as shown in FIG. 1, a processor and memory 26, language translator 22 and speech synthesizer 24 are controlled by processor and memory module 26. The translator 22 communicates with a multi-language database module 28 that provides translation services for multiple languages. A multi-language database module 30 stores the various data necessary to translate the source language message into a variety of target languages. Such data may be stored in database 30 or some or all of the information may be downloaded to the wireless device 12 according to the distribution of processing is balanced between the system 10 and the wireless device 12. The processor/memory 26 may also communicate with the network node 16 to transmit and coordinate information between the various components such as ASR 18, TTS 24 and/or other components.

A language/location database 28 of language and demographical information for locations covered by the network node 16 stores data for probable languages spoken for any given region. A global positioning system (GPS) 32, 34 may communicate with the wireless device 12 and the cellular network node 16 to also integrate and provide location-based data according to the present invention.

Figure 2:
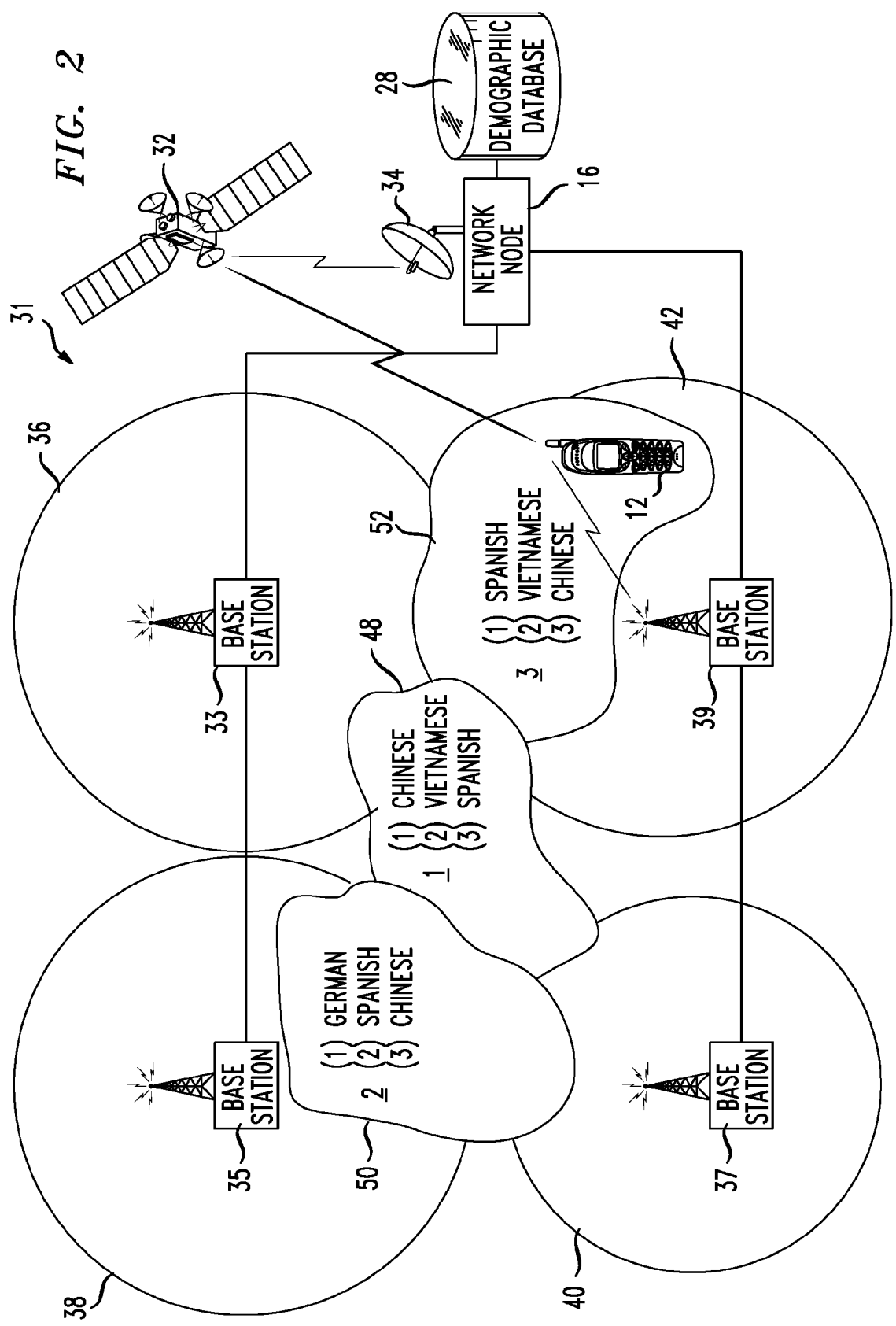
FIG. 2 shows an example of geographic areas covered by cell sites where different languages are predominant in different areas.

FIG. 2 provides a conceptual example 31 of the organization of the language and location database. The location of the wireless device 12 is transmitted to the network node 16 either by the GPS system 32, 34 or through a cellular base station technique known to those of skill in the art. The system may obtain the location of the wireless device 12 by the wireless network using known location determination techniques that may be different for the type of network, such as TDMA, CDMA, EDGE, GSM, 3G, 4G etc. These known techniques provide the necessary data point of the location of the device 12 within the network. Further, the GPS system 32, 34 may communicate the location of the wireless device 12 using a satellite 32 that in turn transmits the location to a receiver 34 or back to the wireless device 12 for communication to the network node 16 for use in ascertaining the appropriate target language priority.

The particular manner in which the location of the wireless device 12 is determined is immaterial to the present invention, therefore any presently known or newly developed methods of determining the location of the wireless device 12 are acceptable. The location of the wireless device 12 is transmitted to the network node 16 and compared to the language and location data in the database 28. The database 28 returns at least one probable target language that the user may encounter at the location of the wireless device 12. The database 28 may also return a prioritized list of likely languages.

The database 28 includes data associated with geographical information coordinated with probable languages encountered in each area and prioritizations of the probabilities of encountering languages. For example, in a certain area of France, an English-speaking person may most likely encounter a person who only speaks French, and the second-most likely language needed may be German for that region. Database 28 maintains updated information for all areas served by the base stations associated with the particular wireless network 10.

The network node 16 receives the location of the device 12 and, from the data in the database 28, obtains at least one probable target language or target language list, and either stores the target language or target language list locally or transmits the target language data to the wireless device 12 through the base station such that the wireless device 12 has an updated language translation list.

FIG. 2 illustrates an example geographic map 31 showing how demographics for spoken languages may vary from cell to cell or from region to region. Base stations 33, 35, 37, and 39 have corresponding cell site coverage areas 36, 38, 40 and 42, respectively. A first area 48 represents a region mostly populated by Chinese speaking people, followed by Vietnamese and finally Spanish speakers. A second region 50 has primarily German speaking people, followed by Spanish and then Chinese speakers. Finally, a third region 52 primarily includes Spanish speakers, followed by Vietnamese and then Chinese speakers. This demographic information is stored in a database 28 accessible by a network node 16. Based on the location of the wireless device 12, shown in FIG. 2 as in the cell site area of base station 39 and in the third region 52, the database 28 transmits to the network node 16 the target language priority list. The language priority list may include one pre-selected target language, such as Spanish in FIG. 2, or a list such as (1) Spanish, (2) Vietnamese, (3) Chinese.

For the location of the wireless device 12 shown in FIG. 2, the language priority information transmitted to the wireless device 12 (either via the cellular network or the GPS system) enables the user to simply select translation services and automatically have Spanish as the translation language. This provides a "one-click" translation service based on location and the associated likely target language for that location.

The demographic data may be organized in a number of different ways. For regions where the language variation is small and the population is homogeneous, a cell-based storage arrangement is preferable. In this case, once the system locates the wireless device as being serviced by a particular base station or base stations, the database 28 will provide an associated target language or group of prioritized target languages and update the chosen language accordingly. In this scenario, a GPS location means may not be required since the wireless system can locate and determine generally where the wireless device is at least on a cell-by-cell basis.

Where language needs vary on a micro level, as is shown in FIG. 2, where predominant language regions are small and single cell sites span more than one region, the translation service requires a more exact location identification means either through the wireless network or the GPS network. In this case, the database 28 stores demographic information on a more detailed basis such that the network can compare the location of the wireless device 12 to the detailed demographic data and transmit the prioritized target language or group of prioritized target languages to the wireless device 12. The demographic information may be updated periodically as populations change. It is unimportant to the present invention how the target language lists are transmitted to the wireless device 12. Depending on the particular wireless standard or protocol used and the GPS capabilities of the wireless device 12, the target language lists may be transmitted to the wireless device 2121 by any wireless means and the mans are not limited to the GPS or cellular systems.

Figure 3:
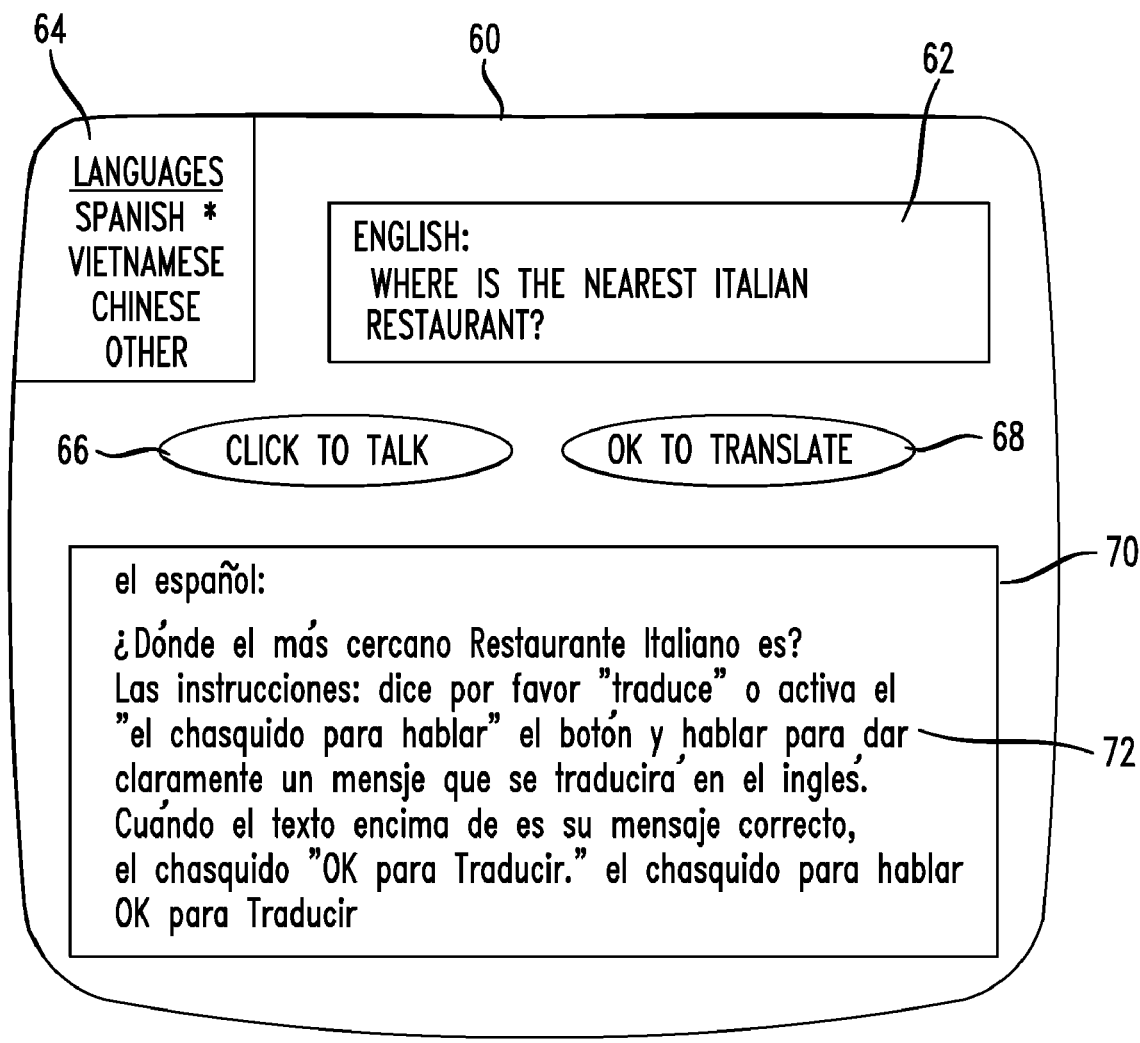
FIG. 3 illustrates a wireless device display used for location-based translation services.

FIG. 3 illustrates an example display 60 associated with the wireless device 12. The layout of the display 60 is controlled by operating software on the wireless device 12. The display includes a source language window 62 and a target language window 70. The source language window 62 will preferably include the text of a received message voiced in the source language. In this manner, the user begins the translation process either by clicking a button 66 to begin or some other means. The user then provides a message such as "Where is the nearest Italian Restaurant?" If ASR is used, the user clicks "click to talk" 66 and, referring back to FIG. 1, the message is transmitted to the base station 14, through the network node 16 to the ASR module 18. The ASR module 18 returns to the wireless device 12 through the network node 16 and base station 14 the text of the recognized message. Correction of the interpreted message may be accomplished using known methods such as that disclosed in FIGS. 13 and 14 and associated text in Franz et al. Other means, such as typing or using a stylus on a touch sensitive screen, may also be used to provide the message as is known in the art.

A menu 64 includes a listing of available target languages. FIG. 3 shows Spanish as the chosen language. This menu may be presented in a variety of different ways. The ordering of the languages in menu 64 is governed by the location of the wireless device 12. As shown in FIG. 2, the wireless device 12 is in region 3 serviced by base station 44. Since the database 28 will return that the most likely target language needed is Spanish, followed by Vietnamese and then Chinese. The network or GPS system transmits this priority list to the wireless device 12 and the menu 64 is modified accordingly.

Once the user is satisfied with the message in the source language window 62 of FIG. 3, he or she clicks "ok to translate" 68. The translator then translates the message into the chosen language, which in this example is Spanish. A text version of the translated message shows in the target language window 70. As shown in FIG. 1, the processor 26 controls the transmission of a text version of the translated message from the translator 22 to the network node 16, which transmits the message to the wireless device 12. The control system of the wireless device (not shown) displays the target language text in the target language window 70. Optionally, in addition to the text of the message being displayed in window 70, the message may also be spoken as generated by the speech synthesizer 24 and transmitted to the wireless device 12 where it is delivered to the user. The system may perform the speech recognition, translation, and synthesis in any combination of processing between the wireless device 12 and the network for optimal performance.

Since the person speaking the target language may not be familiar with the use of the language translation system of the present invention, the window 70 provides instructions in the target language 72 with buttons 66, 68 labeled in the target language for beginning a return message from the target language to the source language. In this case, the same process described above is reversed and a target language message is received, the text provided for review, and upon the target language speaker clicking "ok to translate" 68, the return message is translated from the target language to the source language and displayed in the window 70. Following this pattern, a conversation may occur in different languages.

Preferably, the source language speaker and the target language speaker may use buttons 66 and 68 alternately by the wireless device 12 providing the labels "OK to Translate" and "Click to Talk" in the respective source or target language according to the position in the process of translating a conversation.

As mentioned above, ASR and TTS techniques are not critical to the present invention. A laptop with a wireless modem, for example, may provide the users with a keyboard to simply type in messages for translation. In this case, as with any wireless device, the location-based translation service reduces the number of maneuvers the user must perform before utilizing the translation service.

A benefit of the present invention includes "one-click" language translation. Most wireless devices, such as Palm Pilots®, provide a general application selection status where a user can select various applications such as address book or date book. Typically, from this status, several input operations must occur before the user can open the desired application. For example, if language translation for Spanish is desired, the user may have to open the translation application and then navigate a menu system to choose the target language. According to the present invention, since the system prioritizes the likely target language based on the location of the device, once the language translation application launches, translation can immediately begin. The user only navigates the target language selection menu if the user wants a language other than the most likely needed language.

FIG. 4 shows an example method according to the second embodiment of the invention. As shown in FIG. 4, the method comprises determining a location of the wireless device (82), associating the location of the wireless device with a probable language spoken at the location (84), transmitting data associated with the probable target language to the wireless device (86), and prioritizing the probable target language in a menu system on the wireless device (88). The one-click aspect of the present invention is preferably defined wherein from a general application choice status, such as from a "desktop" from which a number of applications may be chosen, a user can click on a translation option and immediately be in a dialogue window 60 such as the one shown in FIG. 3. In such a dialogue window 60, as in our example, Spanish will be the translation language and the user need do nothing further except begin or take the appropriate action to begin speaking.

The method shown in FIG. 4 may be accomplished using a number of different means. For example, as mentioned above, the step of determining the location of the wireless device may be wireless network dependent according to the specific protocol or may be accomplish through a GPS system and a GPS receiver associated with the wireless device 12. Further, the step of associating the location of the wireless device 12 with a probable target language spoken in the location may further comprise comparing demographic data in a network node 16 associated with cell sites served by the network node 16 with the location of the wireless device 12.

The database 28, as shown in FIG. 2, may be arranged by cell site such that each cell site only has a single language priority list (which is different from that shown in FIG. 2). In this manner, each base station will have an associated language priority list that is transmitted to the wireless device 12 and no smaller level of granularity is provided. The map shown in FIG. 2 shows a more particular level of regions even within cell sites. The GPS aspect of the present invention may provide such granularity by pinpointing the location of the wireless device and providing in the database 28 more detailed maps regarding region demographics.

Although the above description may contain specific details, they should not be construed as limiting the claims in any way. Other configurations of the described embodiments of the invention are part of the scope of this invention. For example, the network node 16 shown in FIG. 1 may comprise all of the automatic speech recognition, translation, and other modules necessary to practice the invention. The language and location database 28 may also be included in any other module or within the network node 16 of the wireless system. In other words, the particular location of these modules in the network or on the wireless device is immaterial and any convenient location for them is considered within the scope of the invention. Accordingly, the appended claims and their legal equivalents should only define the invention, rather than any specific examples given.

We claim:

1. A method of multi-modal interaction with users using a wireless device for language translation, the method comprising:

displaying at the wireless device a list of prioritized target languages associated with a location of the wireless device received via wireless connection, the location detected by a location detection system, when a translation application is activated on the wireless device;

receiving at the wireless device a first message in a first language;

providing at the wireless device associated first text of the received message in a first window; and upon user approval of the first text, translating at a translation device in a network_the first text into a second language and providing second text in a second window in the second language, wherein the second language is selectable from the list of prioritized target languages associated with the location of the wireless device.

2. The method of multi-modal interaction with users using a wireless device for language translation of claim 1, further comprising:
audibly speaking from the device in the second language a translation of the first message.

3. The method of multi-modal interaction with users using a wireless device for language translation of claim 2, further comprising:
providing instructions in the second language for how to speak a message in the second language for translation into the first language.

4. A method of multi-modal interaction with a first user and a second user through a wireless device having a language translation application, the method comprising:
displaying at the wireless device a list of prioritized target languages associated with a location of the wireless device received via wireless connection, the location detected by a location detection system, when a translation services application is activated on the wireless device;
receiving at the wireless device a first message in a first language;
providing at the wireless device a first message text in the first language in a first window;
upon the first user approval of the first message text, translating at a translation device in a network the first message text into a second language and providing at the wireless device the first message text in a second window in the second language;
receiving at the wireless device a second message in the second language;
providing at the wireless device a second message text in the second window in the second language; and
upon the second user approval of the second message text, translating at the translation device in a wireless network the second message text into the first language and providing the second message text in the first window in the first language, wherein the second language is selectable from the list of prioritized target languages associated with the location of the wireless device.

5. The method of multi-modal interaction with a first of claim 4, wherein the second language is preselected according user and a second user through a wireless device having a language translation application to the location of the device.

6. The method of multi-modal interaction with a first user and a second user through a wireless device having a language translation application of claim 5, wherein the second language has the highest probability of needing translation in the location of the wireless device.

\* \* \* \* \*